(12) United States Patent
McCullagh et al.

(10) Patent No.: US 7,860,247 B2
(45) Date of Patent: Dec. 28, 2010

(54) IDENTITY BASED ENCRYPTION

(75) Inventors: Noel McCullagh, Dublin (IE); Michael Scott, Dublin (IE); Neil Costigan, Carlow (IE)

(73) Assignee: Dublin City University, Dublin (IE)

( * ) Notice: Subject to any disclaimer, the term of this patent is extended or adjusted under 35 U.S.C. 154(b) by 601 days.

(21) Appl. No.: 11/667,555

(22) PCT Filed: Nov. 14, 2005

(86) PCT No.: PCT/IE2005/000128

§ 371 (c)(1),
(2), (4) Date: Nov. 6, 2007

(87) PCT Pub. No.: WO2006/051517

PCT Pub. Date: May 18, 2006

(65) Prior Publication Data

US 2008/0144837 A1    Jun. 19, 2008

Related U.S. Application Data

(60) Provisional application No. 60/626,890, filed on Nov. 12, 2004.

(51) Int. Cl.
| | |
|---|---|
| H04L 9/00 | (2006.01) |
| H04L 9/08 | (2006.01) |
| H04L 9/30 | (2006.01) |
| H04L 29/06 | (2006.01) |
| H04L 9/32 | (2006.01) |
| H04K 1/00 | (2006.01) |
| G06F 12/14 | (2006.01) |

(52) U.S. Cl. ............ 380/44; 380/255; 380/281; 380/282; 380/283; 380/284; 380/285; 380/30; 713/150; 713/165; 713/168; 713/171; 713/189

(58) Field of Classification Search .............. 380/44, 380/255, 281–285, 30; 713/150, 165, 168, 713/171, 189
See application file for complete search history.

(56) References Cited

U.S. PATENT DOCUMENTS

| | | | | |
|---|---|---|---|---|
| 2002/0116337 | A1* | 8/2002 | Peled et al. ................... | 705/51 |
| 2004/0081321 | A1* | 4/2004 | Struik ......................... | 380/278 |
| 2004/0225885 | A1* | 11/2004 | Grohoski et al. ............. | 713/189 |
| 2004/0228485 | A1* | 11/2004 | Abu et al. ..................... | 380/44 |
| 2005/0005126 | A1* | 1/2005 | Zhang et al. ................ | 713/176 |
| 2005/0138374 | A1* | 6/2005 | Zheng et al. ................ | 713/166 |
| 2005/0251680 | A1* | 11/2005 | Brown et al. ................ | 713/171 |
| 2006/0023887 | A1* | 2/2006 | Agrawal et al. ............. | 380/277 |
| 2006/0129800 | A1* | 6/2006 | Lauter et al. ............... | 713/151 |
| 2007/0121933 | A1* | 5/2007 | Futa et al. ..................... | 380/1 |
| 2008/0148047 | A1* | 6/2008 | Appenzeller et al. ........ | 713/162 |

FOREIGN PATENT DOCUMENTS

| | | |
|---|---|---|
| EP | 1379024 | 1/2004 |
| GB | 2407948 | 5/2005 |
| WO | WO 03/017559 | 2/2003 |

OTHER PUBLICATIONS

Beguin et al, Intl. Conf. on Theory & Applns . . . , Nov. 28, 1994, pp. 249-259, Secure acceleration of DSS signatures using insecure . . . .
Matsumoto et al, Intl. Conf. on Theory & Applns . . . , Jan. 1988, pp. 497-506, Speeding up Secret Computations with Insecure . . . .
Jakobsson et al, Intl. Workshop on Prac. & Theory, Feb. 15, 2001, pp. 383-401, Secure Server-Aided Signature Generation.
Lim et al, Lecture Notes in Computer Sci., vol. 963, Aug. 31, 1995, pp. 70-83, Security and Performance of Server-Aided RSA . . . .

\* cited by examiner

*Primary Examiner*—Aravind K Moorthy
(74) *Attorney, Agent, or Firm*—Jacobson Holman PLLC

(57) ABSTRACT

A method of performing IBE cryptography comprising the steps of a key generation server transmitting a master public key to a processor, the processor generating or retrieving a fresh master public key derived from the master public key transmitted by the key generation centre, and the processor using the fresh master public key to generate a public key for transmitting a message to a recipient device having a corresponding private key. The processor may store the fresh master public key in a read only memory for repeated use or it may dynamically generate it. To dynamically generate the fresh master public key the processor multiplies the original master public key by a curve co-factor. The processor may be incorporated into a hand-held card, and it may transfer information to a linked second processor for performing some of the calculations.

9 Claims, No Drawings

IDENTITY BASED ENCRYPTION

This is a national stage of PCT/IE2005/000128 filed 14 Nov. 2005 and published in English, claiming the benefit of U.S. Provisional Application No. 60/626,890 filed on 12 Nov. 2004.

FIELD OF THE INVENTION

The invention relates to identity based encryption (IBE) processing for communication of information.

PRIOR ART DISCUSSION

The use of IBE is described for example in US2004/0179684. The concept behind IBE is that a public key can be easily derived from any arbitrary string such as a recipients email address. This public key can then be used to send an encrypted message to the recipient. A key generation centre (KGC) issues system parameters and a master public key. This master public key is derived from some secret information that only the KGC knows. This secret information cannot reasonably be determined from the master public key. The KGC distributes this master public key to users of the system. It is consistent for the lifetime of the system, and so may be distributed just once to each user the first time they use the system. The KGC calculates and distributes to the recipient the private key to be used for decrypting received messages. There is a new private key issued for each new public key. Public keys may have a lifetime much shorter than that of the system. For example a system could append today's date to the identifier and use this value as the basis of a public key. The recipient would have to communicate with the KGC to get a new corresponding private key every day. One KGC master public key may be used with many different strings to encrypt to many different recipients.

The processing required to generate the public key is quite intensive and this presents a barrier to use of IBE by processors with restricted capacity, such as smartcards or mobile phone SIM cards.

One object of the invention is to provide for less intensive processing to implement IBE. Another object is to provide processing on a restricted device, with the assistance of a more powerful computing device.

SUMMARY OF THE INVENTION

According to the invention, there is provided a processor for generating a public key for IBE encryption using a master public key, the processor using fewer operations by generating a public key which is different from that of a target key pair but is compatible with the private key of the pair.

In one embodiment, the processor generates a fresh master public key from an original master public key, and generates the public key from said fresh master public key.

In one embodiment, the processor multiplies the original master public key by a curve co-factor to provide the fresh master public key.

In one embodiment, the processor transfers information to a linked second processor for performing some of the calculations.

In one embodiment, the processor transfers non-sensitive information to the second processor.

In one embodiment, the processor hides sensitive information from the second processor.

In another aspect, the invention provides a processor for performing IBE cryptography, the processor transferring information to a second processor for performing some of the calculations.

In one embodiment, the processor transfers non-sensitive information to the second processor.

In one embodiment, the processor hides sensitive information from the second processor.

In one embodiment, the processor performs a point scalar multiplication and a pairing exponentiation, and pairing calculations are carried out on the second processor.

In one embodiment, the processor performs the processing of one of Eqn. 1 and Tables II, III, IV, and V depending on the sensitivity of the information that the processor is manipulating.

In another aspect, the invention provides a method of performing IBE cryptography comprising the steps of:

a key generation server transmitting a master public key to a processor as defined above, the processor generating or retrieving a fresh master public, key derived from the master public key transmitted by the key generation centre, and the processor using the fresh master public key to generate a public key for transmitting a message to a recipient device having a corresponding private key.

In one embodiment, the processor stores the fresh master public key in a read only memory.

In one embodiment, the processor dynamically generates the fresh master public key.

In one embodiment, the processor multiplies the original master public key by a curve co-factor to provide the fresh master public key.

In one embodiment, the processor is incorporated into a hand-held card.

In one embodiment, the processor transfers information to a linked second processor for performing some of the calculations.

DETAILED DESCRIPTION OF THE INVENTION

The invention will be more clearly understood from the following description of some embodiments thereof, given by way of example only.

In the invention a processor computes a public key which is different from that which would be computed using conventional IBE (Boneh and Franklin, "B&F") processing, and which a KGC expects to be used. However, a message which is encrypted using this public key can still be decrypted by the recipient using the private key provided by the KGC. The different public key can be computed using much less processing capacity than required for the conventional method.

Also, the invention provides for IBE processing by a low-capacity device such as a smartcard, by utilising processing capacity of a linked device such as a mobile phone or terminal. This is achieved without passing secret information such as nonces, private keys, or secret keys to the linked device. The linked device may or may not be trusted to the extent that it honestly carries out its computation and the result can be assumed to be correct and different security measures may be provided for each situation.

In this embodiment, a "card" is a computationally restricted device, however, it may be any other device in other embodiments. The term "terminal" is used to represent a linked and more powerful device. This more powerful device may be linked directly or though a computer network, such as the Internet.

We use the standard bilinear map notation for the modified Tate pairing as set out below, but any pairing can be used. $G_0$ is a group of order large order q. $G_1$ is a group of the same order q. Important properties of pairings are bilinearity and non-degeneracy, as set out in the expressions below.

Bilinear: $\hat{e}(aP, bP) = \hat{e}(P, P)^{ab}$ for all $P \in G_0$, and all $a, b \in \mathbb{Z}_q^*$.

Non-degenerate: If P is a generator of $G_0$, then $\hat{e}(P, P)$ is a generator of $G_1$.

Efficient Generation of B&F IBE Compatible Public Keys from Identifiers.

Prior Art B&F public key generation is set out below. There may be several equally valid ways to compute a suitable intermediate point A'.

$$A' = H(alice@company.com)$$

$$A' = (A_x', A_y')$$

$$A = (cof)A'$$

The following glossary applies.

A is a point of order q.

A'y is a result of a hashing algorithm on Alice's online identifier. The identifier is constructed from her (online) identity (email address, phone number etc) and maybe other publicly available information, under a set of rules outlined by the KGC and made public.

A' is the point on a suitable elliptic curve, that has A'y as its y co-ordinate.

A' may be constructed in many different equally valid ways. The precise way will be decided by the KGC.

Finally A' is multiplied by a curve cofactor to produce a point A.

In the Boneh & Franklin (B&F) IBE specification a public key A is generated by hashing the recipient's email address to provide the Y co-ordinate A'y, The X co-ordinate is then computed by solving the elliptic curve equation using the Y co-ordinate, thus providing the intermediate public key point A'. The final public key point A is then computed by multiplying A' by the curve co-factor. A', the intermediate point may be computed in many different, equally suitable, ways.

The first two steps are very quick, that is, the calculation of A' is very quick. H is a full domain hash returning an element in $\{1 \ldots (p-1)\}$, and step 2 simply involves solving the curve equation. However the co-factor, $cof = (p+1)/q$ (for example for a super-singular curve, but is not restricted to), can be very large and so generating the public key from the identifier can, be very time consuming on a computationally restricted device.

In the invention, a processor performs public key generation much quicker while still maintaining compatibility with B&F IBE. Any public key is always paired with the KGC's master public key sP for encryption. All identifiers are multiplied by this same constant co-factor. Therefore the processor calculates a new master public key $sP\_c = (cof)sP$, and use this in place of the existing master public key sP. This value can be calculated off the card and burnt onto the card at the manufacturing stage. Even if it is calculated on the card it will happen much less frequently than public key generation, typically, only once in the lifetime of the system, as the master public key does not change over the lifetime of the system. This then allows use of A' as the new recipient public key and sP_c as the new KGC master public key.

The operations performed by the processor are set out below.

Using the intermediate point A' as the new recipient's public key, calculating a new value for the KGC's master public key, from the original KGC master public key $sP_c = (cof)sP$, and using the KGC's traditional private key sA.

$$A_y' = H(alice@company.com) \quad \text{Eqn. (1)}$$

$$A' = (A_x', A_y')$$

$$\hat{e}(sP, A) = \hat{e}(sP, (cof)A')$$

$$= \hat{e}(sP_C, A')$$

This constructs a new KGC master public key $sP_c$ as $(cof)sP$, where sP was the old KGC public key. This value is used together with A' to encrypt messages to a recipient, in a way that the KGC does not have to alter the private keys that are issued. A', however it is derived, is used as the public key and not $A = (cof)A'$ as before. Importantly, however the private key remains unchanged as $sA = s(cof)A'$. Therefore the KGC does not need to be re-configured. This makes public key generation from the identifier 20 times quicker, while still being backwardly compatible.

Pairing Computation with the Help of an Honest Terminal.

The following table describes off-loading a pairing calculation, involving a secret point, to a trusted terminal.

TABLE I

| Smartcard | Terminal |
|---|---|
| $x \in_R \mathbb{Z}_q^*$ | |
| $M = xA$ | $\rightarrow$ |
| | $\leftarrow \quad P = \hat{e}(M, P)$ |
| $\hat{e}(A, P) = P^{x^{-1}}$ | |

This table describes masking a point to allow a trusted terminal to calculate a pairing in such a way that the terminal does not learn the point that the card (constrained device) has passed to it. Depending on the trust model, a small additional check may be used. The terminal can be trusted to perform its calculations honestly and to return the correct result. A is some sensitive information that the card hides from the terminal. For example, it could be a B&F IBE private key. A is randomised by a random value x and therefore M can be any element of the group generated by A. Therefore M can be safely passed to the terminal and the terminal will have no advantage in calculating A.

IBE Encryption Pairing with the Assistance of an Un-Trusted Terminal

Rather than the situation above, we show below how to perform a pairing with a terminal that cannot be trusted to perform its part of the protocol correctly. A cheating terminal will be discovered. Off-loading a pairing computation where all points are publicly known, to an un-trusted terminal, and validating the correct result. A point Q and a value $a = \hat{e}(Q, sP)$ are stored on the card. Q and a are not available off the card.

TABLE II

| Smartcard | Terminal |
|---|---|
| $x \in_R \mathbb{Z}_q^*; S = A - Q$ | |
| $xS$ | $\rightarrow \quad p_1 = \hat{e}(xS, sP); p_2 = \hat{e}(A, sP)$ |
| $p_1^q \stackrel{?}{=} 1$ | $\leftarrow$ |
| $p_1^{x^{-1}} xa \stackrel{?}{=} p_2$ | |
| $\hat{e}(A, sP) = p_2$ | |

It is common to calculate the pairing involved in IBE encryption as $e(sP_c,A')^r$ rather than $e(rsP_c,A')$ since pairing exponentiation is quicker than point scalar multiplication. Also, if encrypting to Alice repeatedly the interim result $e(sP_c,A')$ can be pre-computed and stored. We note that $e(sP_c,A')$ is not a secret value, both of the points A' and $sP_c$ are public knowledge, so we do not have to protect these values from the terminal—if we off-load this computation to a card-reader we only have to verify that the correct value has been returned. A random point Q and a value alpha=e(Q,sP) are stored on the card. Q and alpha are not available off the card. This method can be applied in any situation where both points are public knowledge. The use of IBE encryption as an example is just for clarity of exposition.

If the verification on card verifies, then $p_2$ is the correct result of the pairing. On a reasonably powerful computer the computation of $p_1$ and $p_2$ should take about 40 ms.

IBE Decryption, with Un-Trusted Terminal

Now we look at the pairing used in Boneh and Franklin IBE decryption.

This pairing is computed as follows:

$$e(sA, rP)$$

In this case we need to keep the pairing result secret (this is the basis for a symmetric encryption key), the point sA must also remain secret (it is Alice's private key), however the point rP is not secret, it is included in the cipher-text which is public knowledge. We note that the pairing value itself is checked as a central part of B&F IBE decryption. This is to check if the cipher-text has been manipulated by an active attacker on the communications channel. This means that if we want to off-load the computation of this pairing to the card reader we only have to keep the point sA and the result of the pairing secret, fault attacks and devious terminals will cause the decryption to fail. The idea is to allow the IBE decryption to fail if the pairing result is not correct, rather than putting extra validation steps into the pairing protocol. We assume also that a value $g=e(A,P)^s$ (which is public knowledge e(A,sP)) has been pre-computed and stored on the card. Therefore to check this pairing the smartcard and terminal perform the operations set out below.

TABLE III

| Smartcard | Terminal |
| --- | --- |
| $y \in_R \mathbb{Z}_q^*$ | |
| y(sA) | $\rightarrow$ $p_1 = \hat{e}(y(sA), rP)$ |
| $\rho = p_1^{y^{-1}}$ | $\leftarrow$ |
| $r' = H3(V \oplus H_2(\rho), M)$ | |
| $\rho \stackrel{?}{=} g^{r'}$ | |
| $\hat{e}(sA, rP) = \rho$ | |

The above describes loading Boneh and Franklin IBE decryption, in which the result of the pairing is not validated. Rather, the Boneh and Franklin IBE decryption will fail if the correct value is not returned.

The last row in Table 3 is a slightly faster variation on the verification that is carried out as part of B&F IBE decryption. Alternatively, the method suggested by Boneh and Franklin may be used.

If this verification does not succeed then the pairing computation has been compromised as the result of a fault attack or cipher-text has been tampered with.

Other Uses of Pairings

Off-loading a pairing computation to a terminal, where one point is publicly known. The value $\beta = \hat{e}(sA, Q)$ is stored on the card, again Q, sA and $\beta$ are not available off the card.

TABLE IV

| Smartcard | Terminal |
| --- | --- |
| x, y, z $\in_R \mathbb{Z}_q^*$; S = R − Q | |
| xS, y(sA), z(sA) | $\rightarrow$ $p_1 = \hat{e}(y(sA), xS); p_2 = \hat{e}(z(sA), R)$ |
| $p_1^q \stackrel{?}{=} 1$ | $\leftarrow$ |
| $p_1^{(xy)^{-1}} x\beta \stackrel{?}{=} p_2^{z^{-1}}$ | |
| $\hat{e}(sA, R) = p_2^{z^{-1}}$ | |

The above describes P off-loading a pairing to a server where one point is secret and one point is public, and validating the result.

Off-loading a pairing computation to a terminal, where neither point is publicly known. The value $\beta = \hat{e}(sA, Q)$ stored on the card, again Q, sA and $\beta$ are not available off the card.

TABLE V

| Smartcard | Terminal |
| --- | --- |
| w, x, y, z $\in_R \mathbb{Z}_q^*$; S = R − Q | |
| wR, xS, y(sA), z(sA) | $\rightarrow$ $p_1 = \hat{e}(y(sA), xS); p_2 = \hat{e}(z(sA), wR)$ |
| $p_1^q \stackrel{?}{=} 1$ | $\leftarrow$ |
| $p_1^{(xy)^{-1}} x\beta \stackrel{?}{=} p_2^{(zw)^{-1}}$ | |
| $\hat{e}(sA, R) = p_2^{(zw)^{-1}}$ | |

The above describes off-loading a pairing to a server where both points are secret and validating the result.

The only other pairings that are of interest are where one point is secret and the result of the pairing may or may not remain secret, but where the pairing does not undergo a separate validation as in IBE decryption above. We note at this stage that it is generally very easy to append a verification stage to most protocols (simply encrypting a redundant value with an established session key, means that the techniques onlined in the section "IBE Encryption Pairing with the Assistance of an Untrusted Terminal", with some appended verification stage, above might be sufficient for most needs). Again we use sA to denote Alice's private key and sP to denote the KGC master public key. Since we are doing decryption, Alice's private key sA (a value we want to mask) will be constant across all pairings (all messages encrypted to Alice will need her private key to decrypt them). This yeilds the following, with the value beta=e(sA,Q) stored on the card, again Q, sA and beta are not available off the card. Consider the card wants to compute the pairing of e(sA,R). R is publicly known. Again the use of IBE decryption here is for clarity of exposition, any scenario whereby one point is to remain secret could benefit from this method.

We note that in protocols where there is a requirement to mask at least one point (Tables III, IV, and V) the result of the pairing will not be revealed to the terminal during the protocol. This is unavoidable, but generally desirable. If the terminal should need to know the result of the pairing it can always be passed back to the terminal from the card at the end of the protocol. We notice that there is a quick variation on Table IV that allows both points and the result of the pairing to be masked, as set out in Table V for details.

It will be appreciated that the invention provides for performance of IBE cryptography with a requirement for considerably less processor capacity than heretofore. This allows computationally restricted devices such as smartcards to be used.

The invention is not limited to the embodiments described but may be varied in construction and detail.

The invention claimed is:

1. A processor for generating a key for IBE encryption using a master public key, sP,
    the processor generating a fresh master public key sP_c by multiplying the master public key sP by a curve co-factor cof;
    the processor providing as a public key an intermediate key A'=(Ax', Ay'), where Ay' is a hash of public information of the recipient and Ax' is computed by solving an elliptic curve equation using Ay', said public key A' being paired with the fresh master public key sP_c; and
    the processor using the fresh master public key sP_c together with the public key A' to encrypt messages for a recipient having a private key sA.

2. The processor as claimed in claim 1, wherein the processor transfers information to a linked second processor for performing some of the calculations.

3. The processor as claimed in claim 2, wherein the processor transfers non-sensitive information to the second processor.

4. The processor as claimed in claim 2, wherein the processor transfers non-sensitive information to the second processor; and wherein the processor hides sensitive information from the second processor.

5. A method of performing IBE cryptography comprising the steps of:
    a key generation server transmitting a master public key to a processor, for generating a key for IBE encryption using a master public key sP, wherein the processor is adapted to:
        generate a fresh master public key sP_c by multiplying the master public key sP by a curve co-factor cof;
        provide as a public key an intermediate key A'=(Ax', Ay'), where Ay' is a hash of public information of the recipient and Ax' is computed by solving an elliptic curve equation using Ay', said public key A' being paired with the fresh master public key sP_c; and
        use the fresh master public key sP_c together with the public key A' to encrypt messages for a recipient having a private key sA.
    the processor generating or retrieving a fresh master public key derived from the master public key transmitted by the key generation server,
    the processor using the fresh master public key to generate a public key for transmitting a message to a recipient device having a corresponding private key.

6. The method as claimed in claim 5, wherein the processor stores the fresh master public key in a read only memory.

7. The method as claimed in claim 5, wherein the processor dynamically generates the fresh master public key.

8. The method as claimed in claim 5, wherein the processor is incorporated into a hand-held card.

9. The method as claimed in claim 5, wherein the processor transfers information to a linked second processor for performing some calculations.

* * * * *